UNITED STATES PATENT OFFICE.

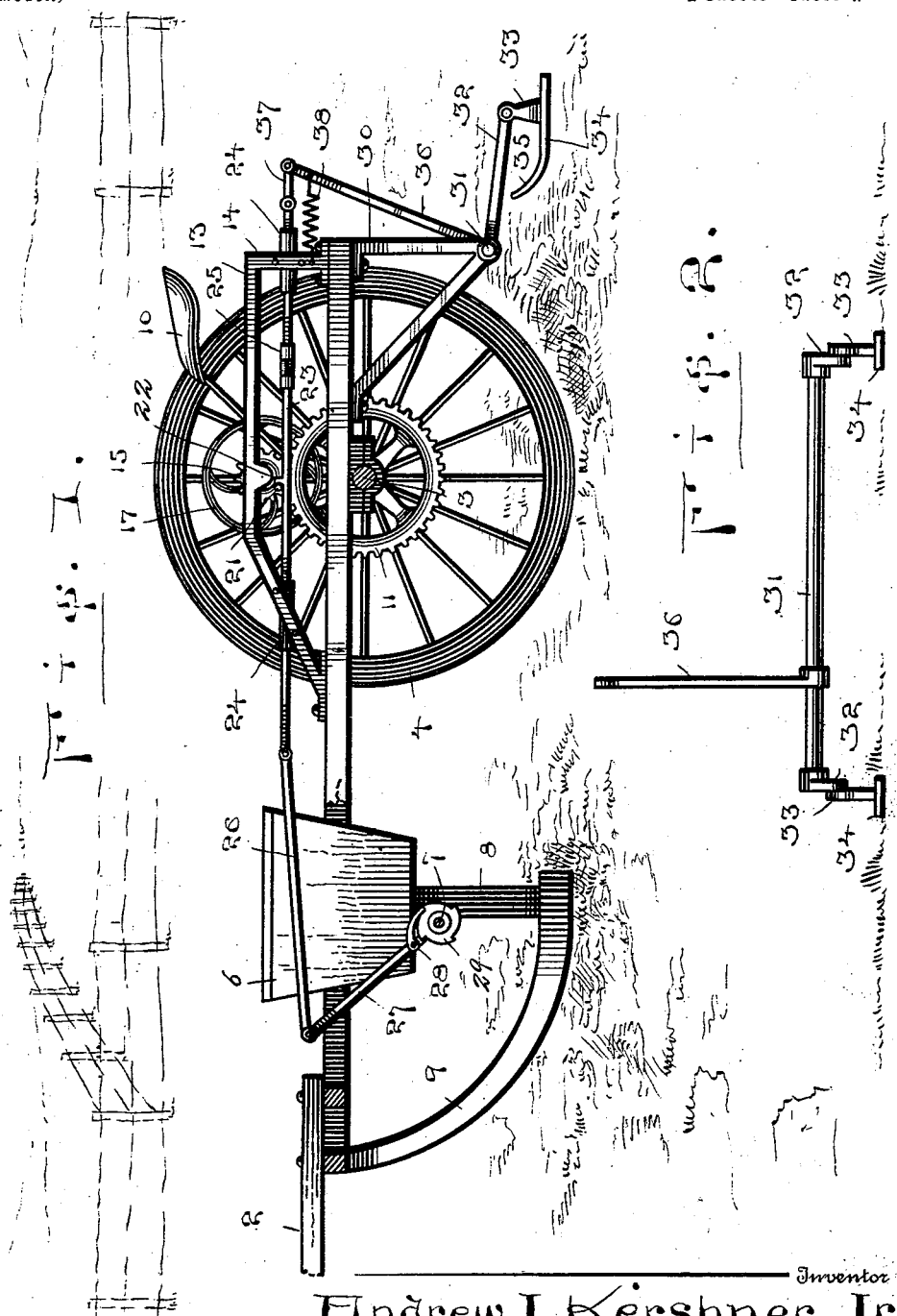

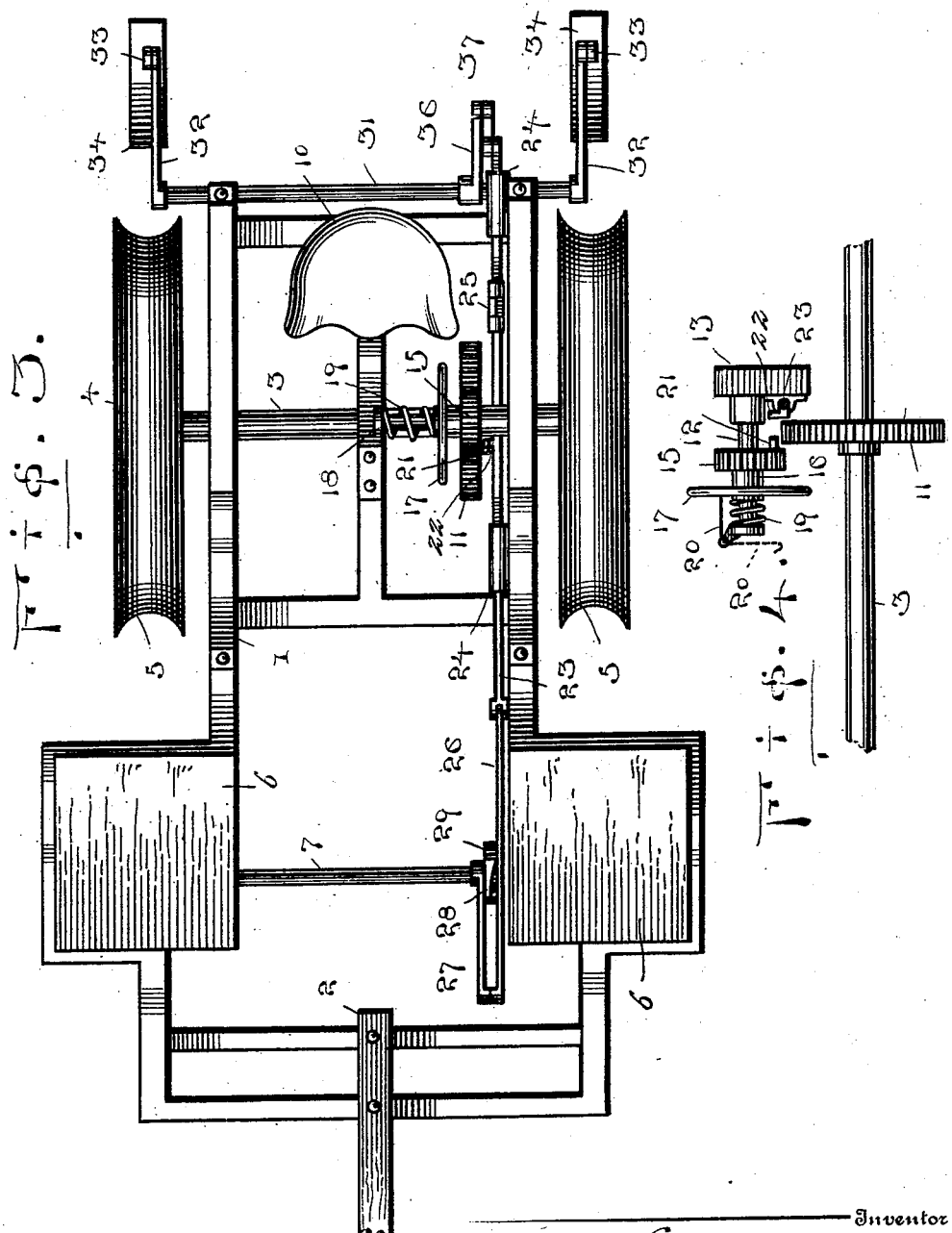

ANDREW JACOB KERSHNER, JR., OF DRYRUN, MARYLAND.

CORN-PLANTER.

SPECIFICATION forming part of Letters Patent No. 713,991, dated November 18, 1902.

Application filed June 2, 1902. Serial No. 109,979. (No model.)

*To all whom it may concern:*

Be it known that I, ANDREW JACOB KERSHNER, Jr., a citizen of the United States, residing at Dryrun, in the county of Washington and State of Maryland, have invented new and useful Improvements in Corn-Planters, of which the following is a specification.

This invention relates to a corn-planter, and particularly to a marking attachment; and the primary object of the same is to provide a marking device simultaneously operative with the means for opening the slide or valve in the seedbox and to indicate in a positive manner precisely the point where the seed is dropped in a regular manner to assist the operator in accurately determining the planted rows and the location of the seed during the subsequent operation of planting cross-rows, and thereby facilitate the regular spacing of the hills.

A further object of the invention is to provide a marking attachment having a direct connection with the mechanism for controlling the operation of the seed slide or slides of a seed box or boxes and mechanism actuated by the axle of the ground-wheels and under the control of the operator for simultaneously bringing the marking device into contact with the ground-surface and opening the seed slide or slides.

With these and other objects and advantages in view the invention consists of the several parts, which will be more fully hereinafter described and claimed.

In the drawings, Figure 1 is a sectional side elevation of a corn-planter embodying the features of the invention. Fig. 2 is a detail view in elevation of the marking attachment. Fig. 3 is a top plan view of the corn-planter. Fig. 4 is a detail elevation of a portion of the operating devices for the improved attachment.

Similar numerals of reference are employed to indicate corresponding parts in the several views.

The numeral 1 designates the frame of the machine, which may be of any preferred construction and has a forward draft-tongue or other device 2 attached thereto. The frame 1 is supported by a rear rotating axle 3, having ground-wheels 4, with concave peripheries or treads 5. On the forward part of the frame in the present instance seedboxes 6 are supported and are provided with any of the well-known forms of seed slides or valves controlled by a rotary shaft 7, extending from one to the other for simultaneous operation and transversely of the frame. Depending from the boxes 6 are chutes or boots 8, communicating with the usual runners or furrow-openers 9. The construction of the corn-planter is not modified to adapt it for operation with the marking attachment, which will be presently set forth, and it is proposed to use any well-known form of planter having either a central seedbox or two boxes, as shown. Moreover, the marking attachment is not limited in its use with corn-planters, but may be equally well employed with cotton or other planters, and, as usual in this class of machines, a driver's or operator's seat 10 is supported in the center of the rear portion of the frame.

The rotary axle 3 has a spur-gear 11 keyed thereon to rotate therewith, and adjacent to the said gear and over the latter is an inwardly-projecting stub-shaft 12, held at its upper end by the horizontal member 13 of an auxiliary frame 14, rising above and secured to one side of the frame 1, and in some makes of planters this auxiliary frame 14 will be applied at the time of the original manufacture on opposite sides to serve as a guard, and in such machines it will be unnecessary to supply this feature of construction. On the stub-shaft 12 a pinion 15 is rotatably and slidably mounted and has a sleeve 16, with a hand-wheel 17 secured thereto, whereby the pinion may be adjusted and shifted in relation to the spur-gear 11 for a purpose which will presently appear. The inner end of the shaft 12 is formed with a flanged head 18, and between this head and the adjacent end of the sleeve 16 a spring 19 is interposed and surrounds the shaft, the function of this spring being to hold the pinion 15 in mesh with the spur-gear 11. When it is desired to disengage the pinion 15 from the gear 11, the operator grasps the hand-wheel 17 and pulls the pinion inwardly on the shaft 12, and to hold the pinion out of mesh against the resistance of the spring 19 a hook 20 is loosely secured at one end to the head 18 and is adapted to be thrown outward and terminally placed in engagement with one of the spokes of the wheel 17. When the hook 20 is in use, it will gravitate or depend from the head to avoid the formation of an interfering projection that might be annoying to the operator. The pinion 15 is provided with an outwardly-projecting striking-pin 21, which is adapted to engage an upstanding projection 22 on a horizontally-disposed slide-bar 23, movable through tubular guides 24, secured to the inner sides of the front and rear extremities of the auxiliary frame 14. The slide-bar 23 may be adjusted as to its length through the medium of a screw-sleeve 25 connecting screw-threaded terminals thereof, and by changing the length of the slide-bar 23, as set forth, its length of stroke may be varied to accelerate or retard the movement of the parts controlled by the said bar. Pivotally connected to the front terminal of the bar 23 is an elongated link 26, having its front end pivotally attached to the upper terminal of an arm 27, movably held on the shaft 7 and carrying a dog or pawl 28, which is held in mesh with a ratchet-wheel 29 on the said shaft 7. As the slide-bar 23 is longitudinally shifted in opposite directions, the arm 27 will be correspondingly oscillated and through the medium of the dog or pawl 28 and ratchet-wheel 29 impart a step-by-step or intermittent rotation to the shaft 7 to operate the seed-delivery devices controlled by said shaft at regular intervals.

Depending from the rear end of the frame 1 at opposite sides are hangers 30, in the lower extremities of which a rock-shaft 31 is movably mounted and provided with terminal arms 32, movably secured at their rear ends to uprights 33, rising from marking-shoes 34, having front upturned ends 35. Rigidly secured to the rock-shaft 31, near one end, is the lower terminal of a connecting rod or arm 36, having its upper end movably attached to the rear end of the slide-bar 23 by a link 37, a spring 38 being also secured at one end to the upper extremity of the rod or lever 36 and to the adjacent portion of the auxiliary frame 14 to restore the said rod or bar, rock-shaft, and shoes carried by the latter to normal position. The shoes 34 are normally held at an elevation above the ground-surface, and when the slide-bar 23 is moved rearwardly the rod or lever 36 is pushed back to actuate the rock-shaft 31 to throw the arms 32 and the shoes 34, carried thereby, with a sudden movement toward the ground-surface, causing the shoes to strike the said surface and slightly dig into it, thereby leaving a distinct mark which will be at a point directly over where the corn or seed has been planted through the medium of the mechanism operating in connection with the seedboxes in advance. The shoes 34 are in direct alinement with the ground-wheels 4 and also with the runners 9 and the chutes or boots 8, and the parts are so timed in their operation that when the slide-bar 23 is moved rearwardly the shoes 34 are thrown down and simultaneously corn or seed is permitted to drop from the seedboxes and be disposed in the ground. The shoes will not be brought in contact with the ground-surface after this operation, nor will corn or seed be planted until the machine has traveled such a distance as to cause the shoes to be located directly over the corn or seed just planted in advance of the last marks made at the rear, this interval of operation being controlled by the adjustment of the slide-bar 23 and the dimension of the pinion 15 relatively to that of the spur-gear 11. It will be observed that the pinion 15 makes a full revolution between each engagement of the pin 21 thereof with the projection $21^a$; but the revolution of the said pinion will be very rapid in view of the reduced diameter thereof relatively to the diameter of the spur-gear 11.

In planting across corners or at certain angles or to meet certain contingencies while the machine is in operation it will become necessary to vary the time of operation of the slide-bar 23 and the marking attachments and seed-delivery devices controlled thereby, and for this purpose the pinion is made slidable on the stub-shaft 12, and through the medium of the hand-wheel 17 the operator can turn back the pinion 15 and change the time of contact of the pin 21 with the projection $21^a$. After the pinion has been thus adjusted it is permitted to again mesh with the spur-gear 11, and thus a variation in the dropping of the corn or seed and the operation of the marking-shoes 34 may be obtained.

The improved attachment will be found exceptionally convenient, and when the machine is transported to and from a field or other plot of ground the pinion 15 will be thrown out of mesh relatively to the spur-gear 11, and so held by the hook 20, thereby rendering the marking attachments and the seed-delivery devices inactive. While the preferred form of the improvement has been shown and described, it will be understood that changes in the proportions, dimensions, form, and minor details may be resorted to without departing from the principle of the invention.

Having thus described the invention, what is claimed as new is—

1. In a corn-planter, the combination with a seedbox having a seed-outlet-controlling device and an axle, of a slide-bar connected to the said controlling device, a marking attachment also attached to the slide-bar and having pivoted shoes adapted to be operated to strike the ground-surface simultaneously with the dropping of the seed from the box, and means actuated by the axle for operating the slide-bar.

2. In a corn-planter, the combination with a seedbox having a seed-outlet-controlling device and a rotary axle, of a longitudinally-disposed adjustable slide-bar connected to said controlling device to impart an intermittent motion to the latter, a rock-shaft connected to the rear extremity of the slide and carrying marking-shoes which are normally held elevated above the ground-surface, and mechanism actuated by the axle to impart motion to the slide-bar.

3. In a corn-planter, the combination with a seedbox having an outlet-controlling device and a rotary axle, of a gear mounted on said axle, a longitudinally-movable slide-rod connected at its front end to the said outlet-controlling device and having an upstanding projection, marking devices connected to the rear end of the slide-bar and adapted to strike the ground-surface simultaneously with the dropping of the seed from the seedbox, and an adjustable pinion carrying a pin to engage the projection of the slide-bar and normally held in mesh with the said gear.

4. In a corn-planter, the combination with a seedbox having a rotary shaft for actuating the outlet device thereof and a rotary axle carrying ground-wheels, of a gear mounted on said axle, a stub-shaft extending inwardly at an elevation above the gear, a pinion rotatably and slidably mounted on the stub-shaft and having an outwardly-extending pin, a longitudinally-disposed adjustable slide-bar having a projection for engagement with the said pin, a ratchet mechanism engaging the shaft in connection with the seedbox and connected to the said slide-bar, a rock-shaft suspended from the rear of the machine and connected to the rear terminal of the slide-bar, the said rock-shaft having arms on which marking-shoes are held, the said shoes being normally elevated above the ground-surface, and means for restoring the parts to normal position between the intervals of engagement of the pin on the pinion with the projection on the slide-bar, the said pinion being normally held in mesh with the gear on the axle.

In testimony whereof I affix my signature in presence of two witnesses.

ANDREW JACOB KERSHNER, Jr.

Witnesses:
FREDERICK D. KERSHNER,
HARVEY H. KEYSER.